United States Patent
Kim et al.

(10) Patent No.: US 7,865,493 B2
(45) Date of Patent: Jan. 4, 2011

(54) APPARATUS AND METHOD FOR SEARCHING FOR DIGITAL FORENSIC DATA

(75) Inventors: Ki Bom Kim, Chungcheongbuk-do (KR); Sang Seo Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 389 days.

(21) Appl. No.: 12/057,428

(22) Filed: Mar. 28, 2008

(65) Prior Publication Data

US 2009/0094203 A1   Apr. 9, 2009

(30) Foreign Application Priority Data

Oct. 5, 2007   (KR) ...................... 10-2007-0100366

(51) Int. Cl.
*G06F 17/30* (2006.01)
(52) U.S. Cl. .................................................... 707/706
(58) Field of Classification Search ...................... 707/3, 707/101, 706; 712/300
See application file for complete search history.

(56) References Cited

U.S. PATENT DOCUMENTS

| | | | |
|---|---|---|---|
| 5,778,359 A * | 7/1998 | Stent | ........................... 712/300 |
| 6,560,596 B1 | 5/2003 | Margulies et al. | |
| 7,013,314 B2 | 3/2006 | Day et al. | |
| 7,103,532 B1 | 9/2006 | Murray et al. | |
| 2006/0106838 A1* | 5/2006 | Ayediran et al. | ............ 707/101 |
| 2007/0085710 A1* | 4/2007 | Bousquet et al. | .............. 341/50 |

FOREIGN PATENT DOCUMENTS

KR   1020070068162 A   6/2007

* cited by examiner

*Primary Examiner*—Etienne P LeRoux
(74) *Attorney, Agent, or Firm*—Ladas & Parry LLP

(57) ABSTRACT

Provided are an apparatus and method for searching for digital forensic data. In particular, provided are an apparatus and method for searching for digital forensic data capable of automatically determining a character encoding type that is used in searching for data. The apparatus for searching for digital forensic data includes: an imaging module for generating an image file from a data source; a file system analysis module for analyzing a file system of the image file to generate file system analysis information; a search module for determining a search character encoding type based on the file system analysis information and searching for the data using the search character encoding type; and a user interface for receiving a command related to a search from a user, transmitting the received command to the file system analysis module and the search module, and outputting the search results to the user. In searching for digital forensic data, information on an operating system, a processor and an active character encoding type, which are actually used by a suspect, is extracted to determine a search character encoding type, so that accuracy and efficiency of searching for data are increased, and time, effort and money spent in determining a character encoding type are reduced.

16 Claims, 4 Drawing Sheets

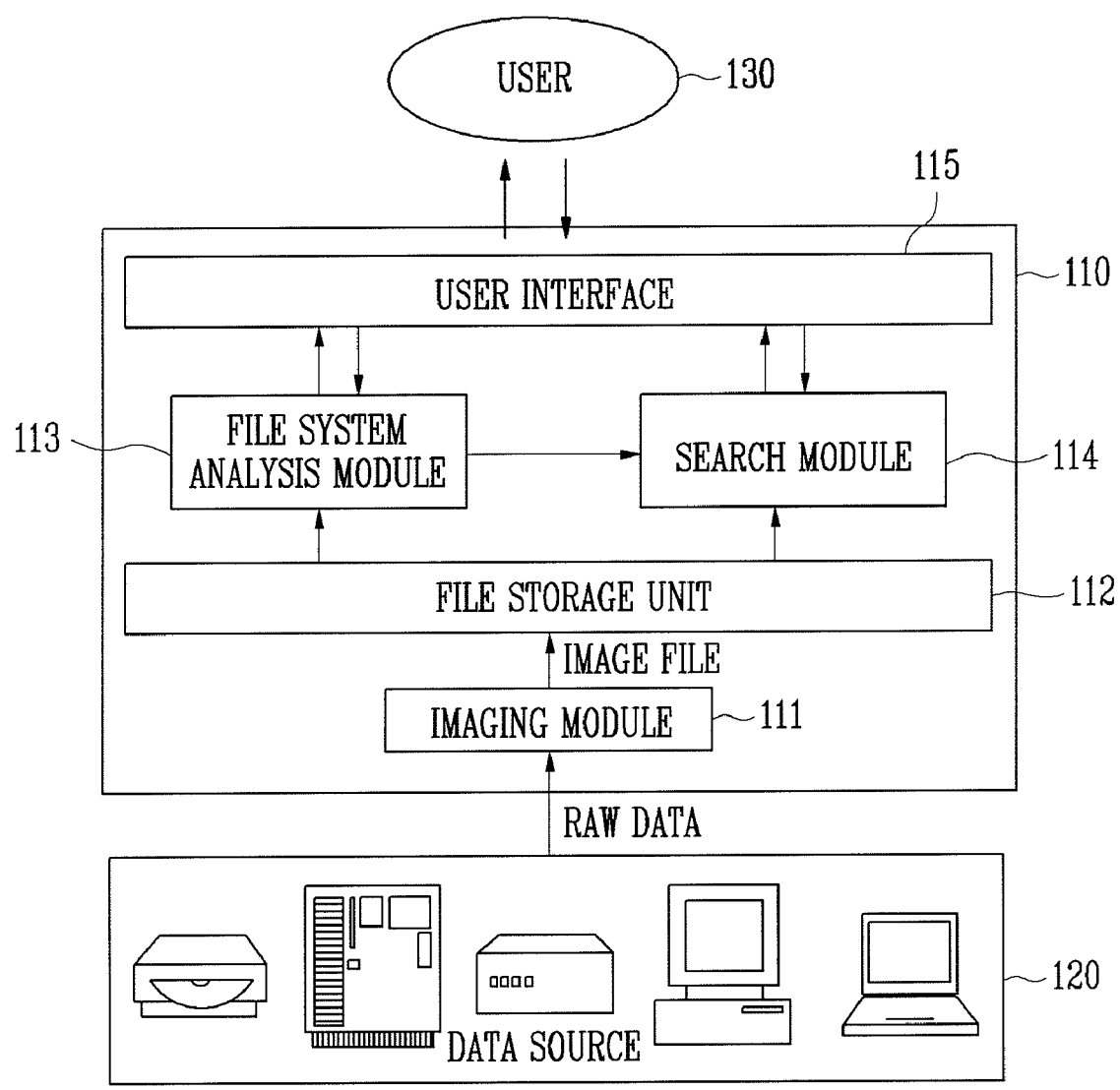

FIG. 2A

| OPERATING SYSTEM TYPE | DAFAULT CHARACTER ENCODING TYPE |
|---|---|
| MS-DOS 5.0 | ASCII |
| Windows XP | UTF-16 |
| Mac OS 8 | Mac_OS_Roman |
| Mac OS X | UTF-8 |
| Red Hat Linux 6.0 | ASCII |
| Red Hat Linux 8.0 | UTF-8 |
| SunOS 4.3 | ASCII |
| Solaris 10 | UTF-8 |

FIG. 2B

| CHARACTER ENCODING TYPE | BYTE ORDER MARK |
|---|---|
| UTF-8 | EF BB BF |
| UTF-16 BE | FE FF |
| UTF-16 LE | FF FE |
| UTF-32 BE | 00 00 FE FF |
| UTF-32 LE | FF FE 00 00 |
| SCSU | 0E FE FF |

FIG. 2C

| PROCESSOR TYPE | BYTE ORDER |
|---|---|
| Intel X86 | Little-Endian(LE) |
| AMD | Little-Endian(LE) |
| Digital Alpha AXP | Little-Endian(LE) |
| HP PA-RISC | Big-Endian(BE) |
| IBM RS/6000 | Big-Endian(BE) |
| Motorola PowerPC | Big-Endian(BE) |
| SUN SPARC | Big-Endian(BE) |
| SGI R4000 | Big-Endian(BE) |

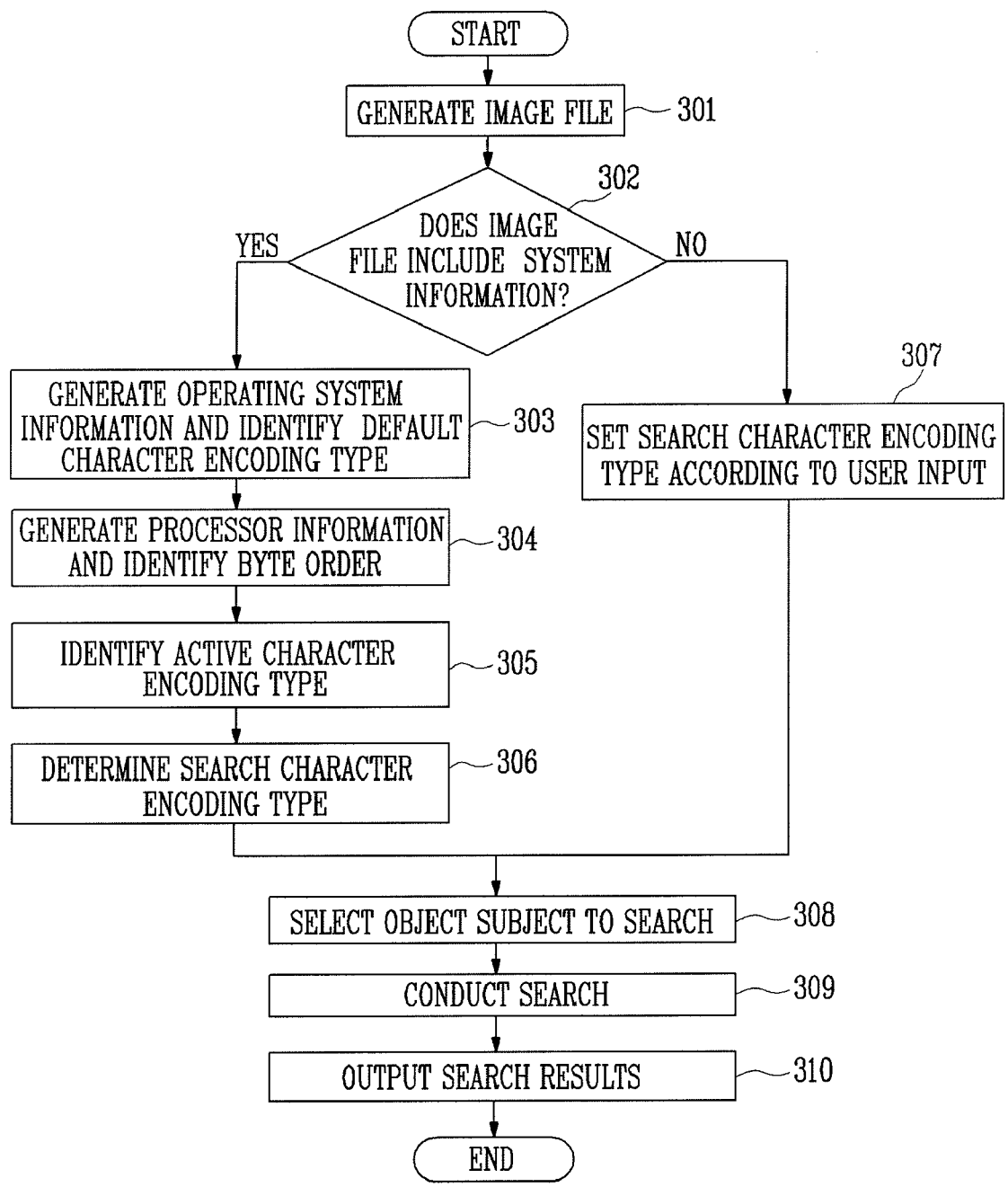

APPARATUS AND METHOD FOR SEARCHING FOR DIGITAL FORENSIC DATA

CROSS-REFERENCE TO RELATED APPLICATION

This application claims priority to and the benefit of Korean Patent Application No. 2007-100366, filed Oct. 5, 2007, the disclosure of which is incorporated herein by reference in its entirety.

BACKGROUND

1. Field of the Invention

The present invention relates to an apparatus and method for searching for digital forensic data, and more particularly, to an apparatus and method for searching for digital forensic data capable of automatically determining a character encoding type used in searching for data.

2. Discussion of Related Art

Digital forensics is a structured investigation process for proving factual relationships in cases based on digital data stored in a computer, a PDA, a mobile phone, etc. Digital forensics is widely used for criminal investigations conducted by national investigation agencies such as a public prosecutor's office and the police, and is considered to be important for the private sector such as an enterprise, a financial company, and so on.

Digital forensics roughly involves processes of collecting, analyzing and submitting evidences. Generally, collecting the evidence is performed by collecting data remaining in storage media such as a computer memory, a hard disk drive, a USB memory, etc. An investigator analyzes the data collected in the process of collecting evidence, performs analysis of the evidence, and obtains useful information necessary for an investigation.

Text included in data can be stored in a different value depending on a character encoding type. For example, when the character encoding type is KSC-5601, UTF-8, UTF-16 Little Endian (LE) or UTF-16 Big Endian (BE), a (Korean) character, ""가"" is stored in hexadecimal format such as B0A1, EAB080, 00AC or AC00, respectively. Therefore, in order for the investigator to search for character information included in data in the process of analyzing evidence, it is necessary to select an accurate character encoding type.

In a conventional method for searching for data, which is used in digital forensics, an investigator sets a character encoding type of data included in evidence by himself/herself to conduct a search. For example, in widely known commercially available digital forensic products, including Guidance Software's ENCASE, AccessData's FTK and X-Ways Software Technology's X-Ways Forensics, a user sets a character encoding type by oneself, or uses an active character encoding type which is currently used in an user's system to search for data.

However, in such a method, it is not possible to accurately know an actual character encoding type of data subject to the search, and thus an investigator should attempt to search for data using all selectable character encoding types. Therefore, in the conventional method for searching for data, accuracy and efficiency of a search for data may deteriorate.

SUMMARY OF THE INVENTION

The present invention is directed to an apparatus and method for searching for digital forensic data, in which, when searching for data included in evidence in digital forensics, a character encoding type that is actually used in the data is estimated to increase accuracy and efficiency of searching for data.

One aspect of the present invention provides an apparatus for searching for digital forensic data including: an imaging module for generating an image file from a data source; a file system analysis module for analyzing a file system of the image file to generate file system analysis information; a search module for determining a search character encoding type based on the file system analysis information and searching for the data using the search character encoding type; and a user interface for receiving a command related to a search from a user, transmitting the received command to the file system analysis module and the search module, and outputting the search results to the user.

Another aspect of the present invention provides a method for searching for digital forensic data including the steps of: generating an image file from a data source; analyzing a file system of the image file to generate file system analysis information; determining a search character encoding type based on the file system analysis information; and searching for the data using the search character encoding type.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIG. 1 is a block diagram illustrating the configuration of an apparatus for searching for digital forensic data according to an exemplary embodiment of the present invention;

FIG. 2A illustrates an Operating system type vs. default Character encoding type Table (OCT) used in an apparatus for searching for digital forensic data according to an exemplary embodiment of the present invention;

FIG. 2B illustrates a Character encoding type vs. Byte order mark Table (CBT) used in an apparatus for searching for digital forensic data according to an exemplary embodiment of the present invention;

FIG. 2C illustrates a Processor type vs. Byte order Table (PBT) used in an apparatus for searching for digital forensic data according to an exemplary embodiment of the present invention; and FIG. 3 is a flowchart illustrating a process of searching for data performed in an apparatus for searching for digital forensic data according to an exemplary embodiment of the present invention.

DETAILED DESCRIPTION OF EMBODIMENTS

The present invention will now be described more fully with reference to the accompanying drawings, in which exemplary embodiments of the invention are shown. This invention may, however, be embodied in different forms and should not be construed as limited to the exemplary embodiments set forth herein.

FIG. 1 is a block diagram illustrating the configuration of an apparatus for searching for digital forensic data according to an exemplary embodiment of the present invention.

Referring to FIG. 1, an apparatus 110 for searching for digital forensic data includes an imaging module 111, a file storage unit 112, a file system analysis module 113, a search module 114 and a user interface 115.

The imaging module 111 reads raw data from a data source 120 subject to digital forensic investigation, generates an image file using the read results, and stores the generated image file in the file storage unit. Here, the data source 120 may include a storage medium such as a CD, a diskette and a USB memory and a storage device included in a system such as a computer, a notebook computer, a mobile phone, a PDA and a PMP.

The file storage unit 112 stores the image file received from the imaging module 111. The file system analysis module 113 analyzes a file system of the image file stored in the file storage unit 112 to generate file system analysis information and generates information on an operating system, a processor and an active character encoding type based on the generated file system analysis information. In one exemplary embodiment, the file system may be determined as NTFS, FAT12, FAT16, FAT32, EXT2, EXT3, UFS or ISO 9660. The file system analysis module 113 may generate information on a normal file, a recovered file, a compound file, a file slack, volume and a unallocated area through the analysis of the file system.

The search module 114 searches for various files, the unallocated area, the file slack and the volume, which are analyzed by the file system analysis module 113. The search module 114 may conduct a search using a search character encoding type, which is determined by the search module 114. After conducting the search, the search module 114 transmits the searched results to the user interface 115. The user interface 115 may output analysis information generated by the file system analysis module 113 and search results transmitted from the search module 114 to the user. Also, the user may input commands related to the search through the user interface 115, and the user interface 115 may transmit the commands to the file system analysis module 113 and the search module 114.

FIGS. 2A, 2B, and 2C illustrate tables used in an apparatus for searching for digital forensic data to efficiently conduct a search according to an exemplary embodiment of the present invention.

Referring to FIG. 2A, an Operating system type vs. default Character encoding type Table (OCT) refers to a table relating a default character encoding type used as a default in an operating system with a name and version of the operating system.

Referring to FIG. 2B, a Character encoding type vs. Byte order mark Table (CBT) refers to a table relating a byte order mark stored in the beginning of a file with a character encoding type. In one exemplary embodiment, a character encoding type that does not include a byte order mark such as ASCII and KSC-5601 may be excluded from the CBT.

Referring to FIG. 2C, a Processor type vs. Byte order Table (PBT) refers to a table relating a byte order used as a default for a processor type with the processor type. In one exemplary embodiment, a processor supporting both Little-Endian (LE) and Big-Endian (BE) may be excluded from the PBT.

The apparatus for searching for digital forensic data according to an exemplary embodiment of the present invention may include the OCT, the CBT and the PBT for an efficient search.

FIG. 3 is a flowchart illustrating a process of searching for digital forensic data performed in an apparatus for searching for digital forensic data according to an exemplary embodiment of the present invention.

Referring to FIG. 3, an image module generates an image file from a data source subject to an investigation and stores the generated results in a file storage unit (301). Then, a file system analysis module analyzes a file system of the image file to determine whether the image file includes system information about an operating system or a processor of the data source (302). In one exemplary embodiment, the file system analysis module may determine whether the image file includes the system information or not based on user's input.

When the image file includes the system information, the file system analysis module generates information about the operating system from the image file and identifies a default character encoding type corresponding to the operating system information based on the OCT (303).

In one exemplary embodiment, when the operating system of the image file uses an NTFS file system, the file system analysis module may generate the operating system information by combining a major version and a minor version of $volume file in an MFT entry. In another exemplary embodiment, when the operating system of the image file uses an EXT2 or EXT3 file system, the file system analysis module may generate the operating system information in a /var/log/syslog file.

Then, the file system analysis module generates information on a processor of the image file and identifies a byte order corresponding to the processor information based on the PBT (304).

In one exemplary embodiment, when the operating system of the image file is Linux or Solaris, the file system analysis module may generate the processor information based on a /proc/cpuinfo file. In another exemplary embodiment, when the operating system of the image file is Windows 2000 or Windows XP, since a byte order is available in the LE only, the file system analysis module may identity the byte order as the LE without going through the process of generating processor information.

After identifying the byte order, the file system analysis module identifies an active character encoding type based on the operating system information and file system analysis information (305). The active character encoding type is referred to as Active Code Page in Microsoft's operating system, and in a Unix operating system it is referred to as locale.

In one exemplary embodiment, when the operating system of the image file is Windows XP, the file system analysis module analyzes a value of a registry located in HKLM\SYSTEM\CurrentControlSet\Nls\CodePage\OEMACP from a registry file stored in %SYSTEMROOT%\System32\config\system to identify an active character encoding type. When the corresponding registry value is 437 or 949, the active character encoding type is identified as ASCII or KSC-5601, respectively.

In another exemplary embodiment, when the operating system of the image file is Solaris, the file system analysis module analyzes a file stored in /etc/locale to identify an active character encoding type. In still another exemplary embodiment, when the operating system of the image file is Linux, the file system analysis module analyzes a /etc/locale.gen file or a /etc/environment file to identify an active character encoding type.

Sequentially, a search module determines a search character encoding type for searching for data (306). Generally, text editor software stores a text according to the default character encoding type used in the operating system unless a user specifies another character encoding type. Therefore, the search module may compare the active character encoding type with the default character encoding type, which are identified by the file system analysis module, to determine the search character encoding type.

In one exemplary embodiment, when the active character encoding type is identical to the default character encoding type or the active character encoding type includes the default character encoding type, the search module may determine the active character encoding type as the search character encoding type. For example, when the active character encoding type is a KSC-5601 which is an extended ASCII code, and the default character encoding type is ASCII, since the active character encoding type includes the default character encoding type, the KSC-5601, which is the active character encoding type, is determined as the search character encoding type. In another exemplary embodiment, when the active character encoding type is different from the default character encoding type, the search module determines the active character encoding type and the default character encoding type as a first search character encoding type and a second search character encoding type, respectively, to simultaneously use the two character encoding types, so that a search is conducted.

In addition, when a text includes a multi-byte character, generally, the text editor software stores a text using a byte order according to a processor type. Therefore, when UTF-16, UTF-32, etc., in which a storage method is changed depending on a byte order, are determined as the search character encoding type, the search module may conduct a search according to a byte order identified by the file system analysis module.

Meanwhile, when it is determined that the image file does not include system information in step 302, since operating system information and processor information cannot be generated from the image file, the search module sets a search character encoding type depending on a user's input like the conventional method for searching for data (307).

When a search character encoding type is determined, the search module selects the target objects subject to the search including a normal file, a recovered file, a compound file, a file slack, a unallocated area, volume, etc. depending on the user's input (308).

Then, the search module searches for the selected object based on the search character encoding type (309). In one exemplary embodiment, when the object subject to the search is a file having a byte order mark, the search module may conduct a search using a character encoding type corresponding to the byte order mark according to the CBT illustrated in FIG. 2B regardless of a search character encoding type.

After the search is completed, the search module outputs search results to the user through a user interface (310). Here, the user interface may output search results using a character encoding type used for the search.

In searching for digital forensic data, information on an operating system, a processor and an active character encoding type, which are used by an actual suspect, is extracted to determine a search character encoding type. Accordingly, accuracy and efficiency of searching for data are increased, and time, effort and money spent in determining a character encoding type are reduced.

Exemplary embodiments of the invention are shown in the drawings and described above in specific terms. However, no part of the above disclosure is intended to limit the scope of the overall invention. It will be understood by those of ordinary skill in the art that various changes in form and details may be made to the exemplary embodiments without departing from the spirit and scope of the present invention as defined by the following claims.

What is claimed is:

1. An apparatus for searching for digital forensic data, comprising:
an imaging module for generating an image file from a data source;
a file system analysis module for determining and analyzing a file system of the image file to generate file system analysis information,
wherein the file system analysis module is configured to determine whether the file system is an NTFS file system, to determine whether the file system is a FAT12 file system, to determine whether the file system is a FATE file system, to determine whether the file system is a FAT 32 file system, to determine whether the file system is an EXT2 file system, to determine whether the file system is an EXT3 file system, to determine whether the file system is a UFS file system, and to determine whether the file system is an ISO9660 file system;
a search module for determining a search character encoding type based on the file system analysis information and searching for the data using the search character encoding type; and
a user interface for receiving a command related to a search from a user, transmitting the received command to the file system analysis module and the search module, and outputting the search results to the user.

2. The apparatus of claim 1, further comprising a file storage unit for storing the image file.

3. The apparatus of claim 1, further comprising an Operating system type vs. default Character encoding type Table relating a name and version of an operating system with a default character encoding type.

4. The apparatus of claim 3, wherein the file system analysis module generates operating system information based on the file system analysis information, and identifies a default character encoding type corresponding to the operating system information based on the Operating system type vs. default Character encoding type Table.

5. The apparatus of claim 4, wherein the file system analysis module identifies an active character encoding type based on the file system analysis information and the operating system information.

6. The apparatus of claim 5, wherein the search module determines the search character encoding type based on the default character encoding type and the active character encoding type.

7. The apparatus of claim 5, further comprising a Processor type vs. Byte order Table relating a processor type with a byte order.

8. The apparatus of claim 7, wherein the file system analysis module generates processor information based on the file system analysis information and the operating system information, and identifies a byte order corresponding to the processor information based on the Processor type vs. Byte ordering Table.

9. The apparatus of claim 8, wherein the search module determines the search character encoding type based on the default character encoding type, the active character encoding type and the byte order.

10. The apparatus of claim 1, further comprising a Character encoding type vs. Byte order mark Table relating a character encoding type with a byte order mark.

11. The apparatus of claim 10, wherein the search module determines a character encoding type corresponding to the byte order mark that the data have based on the Character encoding type vs. Byte order mark Table as the search character encoding type.

12. A method for searching for digital forensic data, comprising steps of:
generating an image file from a data source;
determining, using one or more programmed processors, a file system of the image file by determining whether the file system is an NTFS file system, by determining whether the file system is a FAT12 file system, by determining whether the file system is a FAT6 file system, by determining whether the file system is a FAT 32 file system, by determining whether the file system is an EXT2 file system, by determining whether the file system is an EXT3 file system, by determining whether the file system is a UFS file system, and by determining whether the file system is an ISO9660 file system;

analyzing the file system of the image file to generate file system analysis information;

determining a search character encoding type based on the file system analysis information; and searching for the data using the search character encoding type.

13. The method of claim 12, after the step of analyzing the file system of the image file, further comprising the steps of:

generating operating system information and processor information based on the file system analysis information;

identifying a default character encoding type based on the operating system information;

identifying a byte order based on the processor information; and identifying an active character encoding type based on the file system analysis information and the operating system information.

14. The method of claim 13, wherein, in the step of determining the search character encoding type, the search character encoding type is determined based on the default character encoding type, the byte order and the active character encoding type.

15. The method of claim 12, wherein the file system analysis information which includes a normal file, a recovered file, a compound file, and a file slack of the determined file system.

16. The apparatus of claim 1, wherein the file system analysis module is also configured to analyze the determined file system by generating information on a normal file, a recovered file, a compound file and a slack file from the determined file system.

* * * * *